Nov. 7, 1939.  G. H. TOMLINSON ET AL  2,179,456

METHOD OF AND APPARATUS FOR TREATING PULP RESIDUAL LIQUOR

Filed Oct. 27, 1936  3 Sheets-Sheet 2

INVENTORS
George H. Tomlinson
Leslie S. Wilcoxson
BY
ATTORNEY.

Patented Nov. 7, 1939

2,179,456

UNITED STATES PATENT OFFICE 2,179,456

METHOD OF AND APPARATUS FOR TREATING PULP RESIDUAL LIQUOR

George H. Tomlinson, Westmount, Quebec, Canada, and Leslie S. Wilcoxson, Ridgewood, N. J., said Wilcoxson assignor of his right to The Babcock & Wilcox Company, Newark, N. J., a corporation of New Jersey Application October 27, 1936, Serial No. 107,784

15 Claims. (Cl. 23—48)

This invention relates particularly to a process of and apparatus for treating the residual cooking liquor which is produced in the sulphite process of manufacturing pulp from cellulosic fibrous materials.

The cooking liquor ordinarily employed in the sulphite process contains mainly an acid sulphite compound of calcium. Dolomitic limestone is occasionally used for the source of the calcium base, and in such processes magnesium compounds in varying amounts will also be present in the cooking liquor. The residual liquor from the cooking operation is generally discharged into streams or bodies of water and because of the high oxygen-absorbing property of its chemical constituents it pollutes the water into which it is discharged. This water pollution problem has been the cause of considerable agitation and preventive legislation. Such legislation has usually not been strictly enforced heretofore because of the lack of any system of economically disposing of the residual cooking liquor in other ways.

The main object of our invention is the provision of a simple and effective process of and apparatus for economically disposing of sulphite residual cooking liquor.

In accordance with our invention the sulphite residual liquor is concentrated to a suitable concentration and then introduced into a high temperature recovery furnace where its combustible organic constituents are burned under furnace conditions yielding a light, dry, non-combustible solid residue. The heat generated in the furnace is more than sufficient for maintaining the desired temperature conditions in the furnace and dehydrating the incoming liquor and the excess heat values may be utilized for the generation of steam for plant purposes, including the concentration of the residual liquor to be treated. The residue or ash is caused to pass out of the furnace in suspension in the heating gases generated, through a steam boiler, to a dust separator wherein the solids in suspension are removed.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter.

Figure 1:
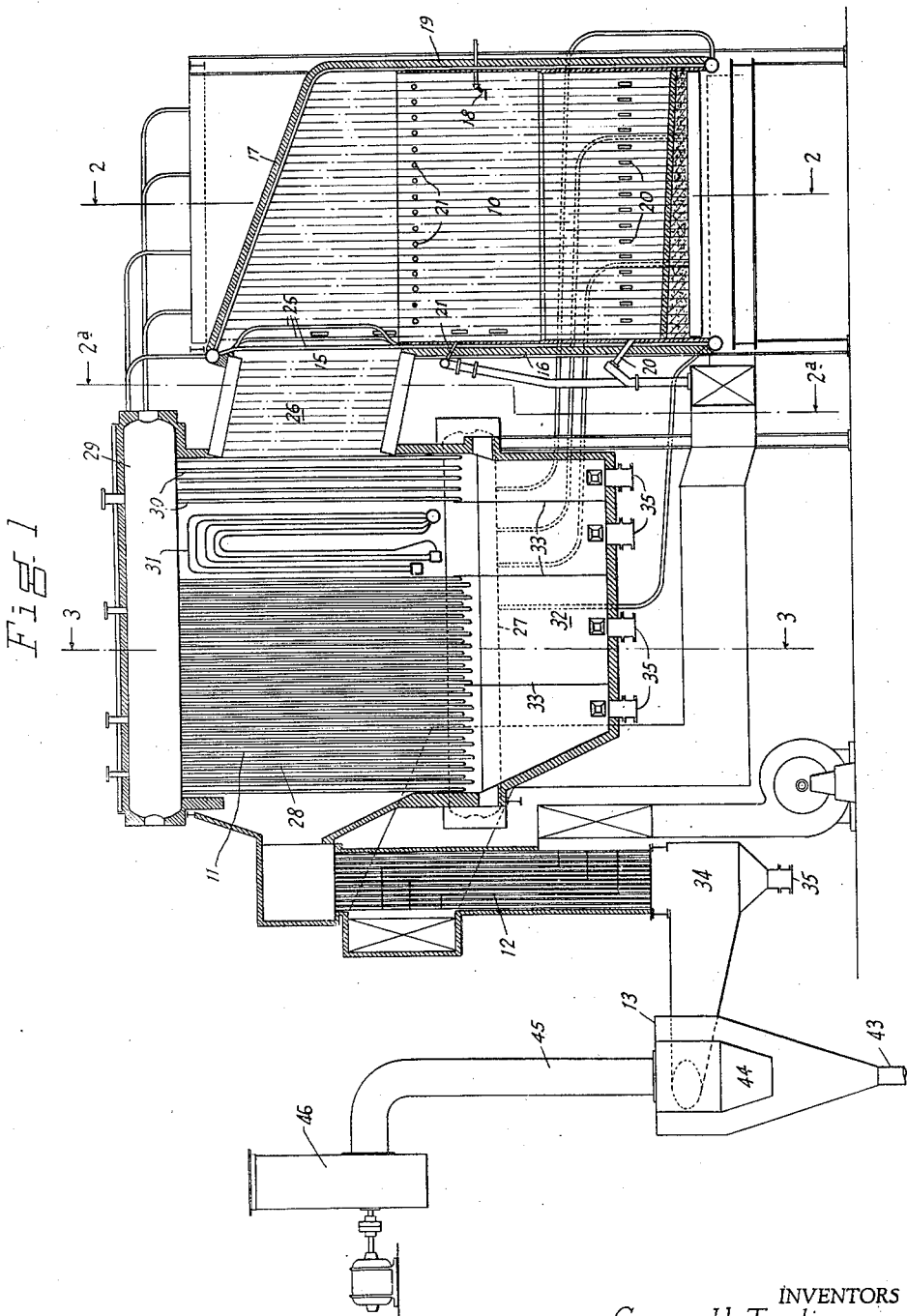
Figure 2:
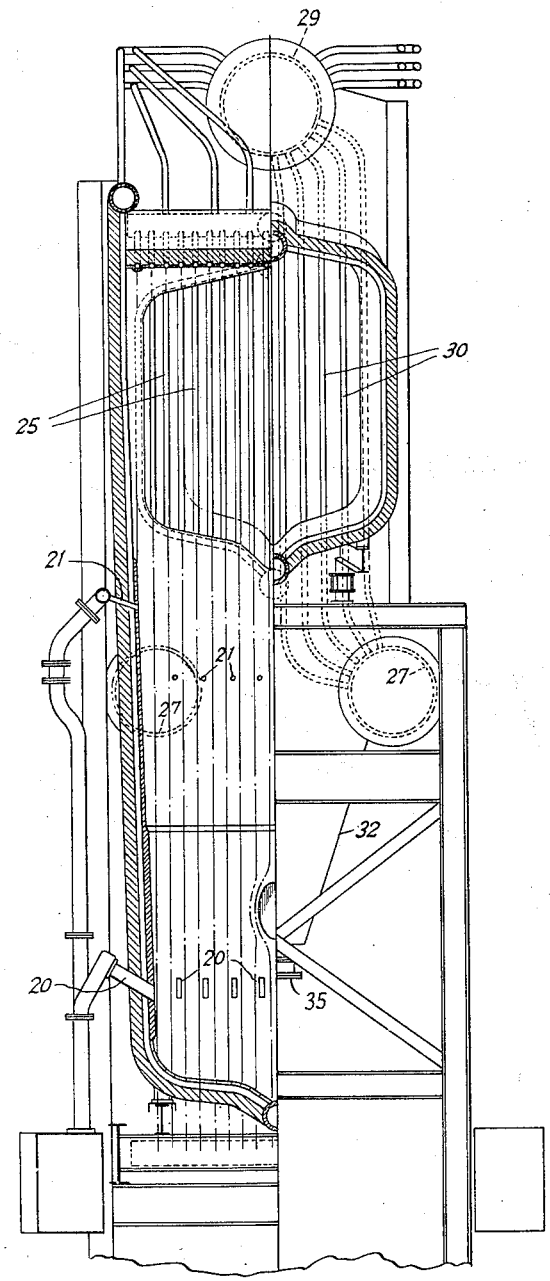
Figure 3:
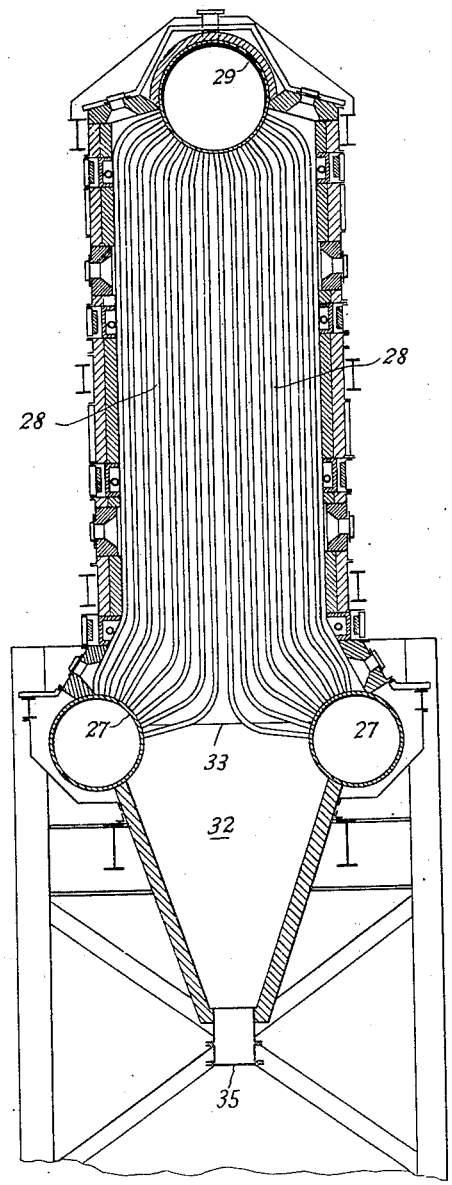

Of the drawings:

Fig. 1 is a somewhat diagrammatic view of a recovery unit constructed in accordance with our invention; Fig. 2 is an enlarged vertical view taken partly on the line 2—2 and partly on the line 2ᵃ—2ᵃ of Fig. 1; and Fig. 3 is an enlarged sectional view taken on the line 3—3 of Fig. 1.

In practicing our invention the sulphite residual cooking liquor is separated from the pulp, and passes through a series of evaporator stages, preferably of the multiple-effect type, where its solid concentration is substantially increased. In general a concentration of 45–60% solids will be satisfactory with sulphite liquor. The upper limit of concentration is determined necessarily by the viscosity at which satisfactory spraying of the liquor into the furnace can be accomplished and scale formation in the evaporator does not become too troublesome. One sample of sulphite liquor successfully treated in accordance with our invention showed the following analysis after being concentrated:

| | |
|---|---|
| Baumé at 60° F | 30.8° |
| Moisture | 51.1% |
| Carbon | 22.1 |
| Hydrogen | 2.3 |
| Sulphur | 2.4 |
| Ash | 8.0 |
| Oxygen and nitrogen | 14.1 |
| B. t. u. per lb | 3780 |

The concentrated liquor is delivered to a recovery unit for recovery of its heat and chemical values. As shown, the recovery unit comprises as its main elements a water cooled recovery furnace 10, a steam boiler 11, an air heater 12, and a dust separator 13, together with the usual forced and induced draft fans, pumps, control equipment, and other auxiliaries. The furnace, steam boiler and air heater elements of the recovery unit are constructed and arranged the same as those disclosed in a copending application of L. S. Wilcoxson, Serial No. 97,323, filed August 22, 1936, except for the omission of a smelt outlet and spout from the recovery furnace. The furnace shown is of the vertical shaft type having a rectangular horizontal cross-section and side walls tapering slightly towards its bottom. A heating gas outlet 15 is formed in the upper part of its rear wall 16 below the inclined roof 17. The furnace vertical walls and roof are defined by studded tubes wholly or partly covered by refractory. The concentrated liquor is delivered to a spray nozzle 18 in the furnace front wall 19 arranged to oscillate about vertical and horizontal axes and is sprayed substantially horizontally across the upper section of the furnace against the vertical side and end walls. The liquor is substantially dehydrated during its passage by contact with the furnace gases and deposits in a sticky condition in successive layers on the furnace walls. The deposited sulphite liquor forms a mass of char on the walls very similar to that obtainable with sulphate residual liquor. The char falls in lumps onto the furnace hearth from time to time and as it is exceedingly reactive and combustible, readily burns thereon.

The air for combustion is preferably preheated and supplied to the furnace at two levels, primary air being introduced adjacent the hearth through downwardly directed primary air ports 20 in the side and rear walls and secondary air above the level of the mass of char through secondary air ports 21. Suitable regulating provisions are provided to control the supply of air to each nozzle. The air regulating provisions may be controlled to maintain either an oxidizing or reducing atmosphere in the recovery furnace. In operation, the bed of char on the hearth will be penetrated by the downwardly impinging streams of preheated air on three sides providing suitable conditions for rapid combustion. The organic combustible constituents of the char are burned leaving a non-combustible ash residue in the form of light dry unsintered particles containing the chemical solids. Some sulphur gases may be released during the furnace treatment depending upon the composition of the residual liquor and be recovered from the heating gases generated if economically justified. The ash on the hearth builds up in a bed approximately the level of the primary air ports and any ash forming above that level is swept up from the bed by the impinging primary air streams and carried upwardly by the furnace gases through the furnace. It has been found that the non-combustible residue from sulphite residual liquor containing compounds of alkaline earth and related metals with the exception of sodium will be infusible at furnace temperatures below approximately 2800° F. and accordingly may be recovered when incinerated under lower furnace temperatures as a dry ash. In the recovery furnace described the furnace temperature can be readily maintained below the ash fusion temperature. The ash disposal from the furnace is thus entirely by flotation in the stream of heating gases, the ash consisting mainly of small light cenospheres and flakes.

The ash-laden gases pass outwardly through a tube screen 25 and water cooled throat 26 into the steam boiler 11. The steam boiler employed is preferably of the three-drum type with the two lower drums 27 spaced apart and connected by side-by-side banks of bent tubes 28 to the common upper drum 29. In the steam boiler the gases successively contact with a group of screen tubes 30, superheater tubes 31, and the main banks of steam generating tubes. The employment of a steam boiler of the type disclosed is conducive to collection of the ash in that portion of the recovery unit. The ash separating from the gases in the steam boiler does not stick to the boiler tubes but drops into a hopper 32 below the boiler bank. The hopper 32 is divided into sections by partitions 33 to prevent by-passing of the gases about the boiler surface and each section or compartment has a valve controlled outlet 35 for the removal of accumulated ash.

On leaving the steam boiler the ash-laden gases pass through the tubes of the tubular air heater 12 to an outlet compartment 34, also provided with a discharge outlet 35 for ash separating in the air heater. Air for the furnace is preheated by contact with the outside of the tubes.

Most of the ash in suspension however is separated in a suitable dust separator, such as the cyclone separator 13 indicated in Fig. 1. The ash separated out in the cyclone 13 is withdrawn from the bottom thereof through a pipe 43, while the clean gases pass upwardly through an inner cone 44 and a conduit 45 to an induced draft fan 46 connected to the stack.

With the described process and apparatus over sixty percent (60%) of the heat value of the sulphite liquor can be recovered in the steam generated, with a high percentage of recovery of the chemical content of the liquor, the inorganic chemicals being collected in a form which permits their disposal other than by water pollution. By maintaining an oxidizing atmosphere in the furnace the expected chemical constituents of the ash with a calcium base cooking liquor would be mainly calcium sulphate ($CaSO_4$) and calcium carbonate ($CaCO_3$), with possibly small amounts of calcium oxide ($CaO$), and calcium sulphide ($CaS$). If a larger percentage of calcium sulphide ($CaS$) should be desired, a reducing atmosphere can be maintained. The amount of steam generated is such that this process affords an economic and unobjectionable method of disposing of the residual pulp liquor.

While in accordance with the provisions of the statutes we have illustrated and described herein the best form of our invention known to us, those skilled in the art will understand that changes may be made in the form of the apparatus disclosed without departing from the spirit of the invention covered by our claims, and that certain features of our invention may sometimes be used to advantage without a corresponding use of other features.

We claim:

1. The process of treating sulphite pulp residual liquor which comprises burning the liquor in a furnace chamber under furnace conditions yielding a dry non-combustible ash residue, removing substantially all of the ash produced from the furnace by flotation in the heating gases, and separating ash from the heating gases after leaving the furnace.

2. The process of recovering chemicals from sulphite pulp residual liquor which comprises concentrating the liquor, burning the concentrated liquor in a furnace chamber under furnace conditions yielding a non-combustible chemical ash residue in a dry unsintered condition, removing substantially all of the ash produced from the furnace by flotation in the furnace gases, and separating the ash from the furnace gases after leaving the furnace.

3. The process of recovering heat and chemicals from sulphite pulp residual liquor which comprises concentrating the liquor, burning the concentrated liquor in a furnace chamber at temperatures below the fusion temperature of its non-combustible constituents and collecting a non-combustible ash residue in a bed therein in a dry unsintered condition, removing ash from the furnace by sweeping the ash bed with a current of combustion air to cause the ash to be carried out of the furnace by flotation in the furnace gases, recovering heat from the gases leaving the furnace by a heat exchange operation, and separating the ash from the furnace gases in a dust separating operation.

4. The process of recovering heat and chemicals from sulphite pulp residual liquor which comprises concentrating the liquor to a solid concentration above 40%, burning the combustible organic constituents of the concentrated liquor in a furnace chamber at temperatures below the fusion temperature of its non-combustible constituents and under an oxidizing atmosphere to produce a dry unsintered ash residue, collecting the non-combustible ash residue in a bed therein, removing ash from the furnace by continuously sweeping the ash bed with a current of combustion air to cause the ash to be carried out of the furnace in suspension in the heating gases, absorbing heat from the heating gases for the generation of steam, and separating ash from the heating gases after leaving the furnace in a dust separating operation.

5. A process of treating sulphite pulp residual liquor which comprises introducing the liquor into a recovery furnace in a spray directed into the upper section of the furnace and of a character such that the spray particles impact on a wall surface of the furnace after passing through and being heated by an ascending stream of high temperature gases sufficiently to put the spray particles in a sticky condition, whereby the spray particles deposit in an adhering mass over an extended wall area and from which mass dehydrated portions separate and collect in the lower section of the furnace, supplying air to the furnace for the combustion of the separated material, burning the separated material to a dry ash residue and removing substantially all of the ash produced from the lower section of the furnace by flotation in the furnace gases generated, and withdrawing the ash-laden gases from the upper section of the furnace after contacting with liquor being sprayed into the upper section of the furnace.

6. A process of treating sulphite pulp residual liquor which comprises introducing the liquor into a recovery furnace in a spray directed across the upper section of the furnace and formed of spray particles of a size and at a velocity such that a major portion of the spray particles impact on a wall surface of the furnace after passing through and being heated by an ascending stream of high temperature gases sufficiently to put the spray particles when impacting in a sticky condition, whereby the spray particles deposit in an adhering mass over an extended wall area and from which mass dehydrated portions separate and collect in the lower section of the furnace, supplying air to the furnace for the combustion of the separated material, burning the separated material to a dry unsintered ash residue and removing substantially all of the ash produced from the lower section of the furnace by flotation in the furnace gases generated, and withdrawing the ash-laden gases from the upper section of the furnace after contacting with liquor being sprayed across the upper section of the furnace.

7. A process of treating sulphite pulp residual liquor which comprises concentrating the liquor, continuously introducing the concentrated liquor into a vertical recovery furnace in a spray directed across the upper section of the furnace and formed of spray particles of a size and at a velocity such that a major portion of the spray particles impact on a vertically disposed wall surface of the furnace after passing through and being heated by an ascending stream of high temperature gases sufficiently to put the spray particles when impacting in a sticky condition, shifting the area of impact of the spray to cause the spray particles to deposit in an adhering mass over an extended wall area and from which mass dehydrated portions separate and collect in a lower section of the furnace, supplying air to the furnace for the combustion of the separated material, burning the separated material, to a dry unsintered ash residue and removing substantially all of the ash produced from the lower section of the furnace by flotation in the furnace gases generated, withdrawing the ash-laden gases from the upper section of the furnace after contacting with liquor being sprayed across the upper section of the furnace, and separating the ash from the gases withdrawn from the furnace.

8. Apparatus for recovering heat and chemicals from sulphite pulp residual liquor comprising a furnace having means for burning the liquor therein and a closed bottom devoid of smelt outlets collecting an ash residue in a dry condition in the bottom thereof, a heating gas outlet in the upper part thereof, means including a multiplicity of air inlet ports in at least two of the side walls of said furnace and adjacent the furnace bottom causing a current of air to sweep up substantially all of the collected ash from the furnace bottom and cause the same to be carried upwardly through said furnace to said outlet, a steam boiler arranged to receive the ash-laden gases from said furnace and having hopper means for collecting ash separating from the gases while passing through said steam boiler, and a dust separator arranged to receive the ash-laden gases from said steam boiler and separate the ash therefrom.

9. Apparatus for recovering heat and chemicals from sulphite pulp residual liquor comprising a recovery furnace having means for burning waste liquor therein and a closed bottom devoid of smelt outlets collecting an ash residue in a dry condition in the bottom thereof, a heating gas outlet in the upper part thereof, means including a multiplicity of air inlet ports in at least two of the side walls of said furnace and adjacent the furnace bottom causing a current of air to sweep up substantially all of the collected ash from the furnace bottom and cause the same to be carried upwardly with the furnace gases to said outlet, a steam boiler arranged to receive the ash-laden gases from said furnace and having hopper means for collecting ash separating from the gases while passing through said steam boiler, a heat exchanger in the path of the gases leaving said steam boiler, and a dust separator arranged to receive the ash-laden gases from said heat exchanger and separate the ash therefrom.

10. The process of treating sulphite pulp residual liquor which comprises incinerating the liquor in a furnace chamber under furnace conditions yielding a residue of the incombustible constituents of the liquor in the form of a dry unsintered ash, and removing substantially all of the ash produced from the furnace chamber by flotation in the furnace gases generated.

11. The process of treating sulphite pulp residual liquor which comprises incinerating the liquor in a furnace chamber under furnace temperatures below the fusion temperature of the incombustible constituents of the liquor to obtain a residue in the form of a dry unsintered ash, and continuously removing substantially all of the ash produced from the furnace chamber by flotation in the furnace gases generated.

12. The continuous process of treating sulphite pulp residual liquor which comprises burning the concentrated liquor in a furnace chamber without requiring the addition of auxiliary fuel under furnace conditions yielding a non-combustible ash residue in a dry unsintered condition, and removing from the furnace substantially all of the ash residue produced during the incinerating operation by flotation in the combustion gases generated.

13. The continuous process of treating sulphite pulp residual liquor which comprises concentrating the liquor, burning the concentrated liquor in a furnace chamber without requiring the addition of auxiliary fuel under furnace conditions yielding a non-combustible chemical ash residue in a dry unsintered condition, continuously removing from the furnace chamber substantially all of the ash residue produced during the incinerating operation by flotation in the combustion gases generated, and causing the ash residue to separate from the combustion gases after the gases leave the furnace chamber.

14. The process of treating sulphite pulp residual liquor which comprises concentrating the liquor, burning the concentrated liquor in a furnace chamber at temperatures below the fusion temperature of its non-combustible chemical constituents and causing a non-combustible chemical ash residue to form in a bed therein in a dry unsintered condition, and removing from the furnace chamber substantially all of the ash residue collected in the bed by sweeping the bed with a current of combustion air to cause ash to be carried out of the furnace chamber by flotation in the furnace gases.

15. The process of treating sulphite pulp residual liquor which comprises concentrating the residual liquor, spraying the concentrated liquor into a high temperature furnace chamber, burning the concentrated liquor so introduced therein while maintaining a normal mean furnace temperature below the fusion temperature of the non-combustible constituents of the liquor to yield a dry ash residue containing a relatively high proportion of chemical compounds, and removing from the furnace chamber substantially all of the ash residue produced during the incinerating operation by flotation in the combustion gases generated.

GEORGE H. TOMLINSON.
LESLIE S. WILCOXSON.